United States Patent
Sato et al.

(10) Patent No.: US 10,706,975 B2
(45) Date of Patent: Jul. 7, 2020

(54) OPERATING FLOOR CONFINEMENT AND NUCLEAR PLANT

(71) Applicant: Kabushiki Kaisha Toshiba, Minato-ku (JP)

(72) Inventors: Takashi Sato, Yokohama (JP); Keiji Matsumoto, Yokohama (JP); Keisuke Taguchi, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 623 days.

(21) Appl. No.: 15/137,440

(22) Filed: Apr. 25, 2016

(65) Prior Publication Data

US 2016/0336081 A1    Nov. 17, 2016

(30) Foreign Application Priority Data

May 15, 2015    (JP) .................................. 2015-099952

(51) Int. Cl.
    *G21C 13/10*    (2006.01)
    *G21C 13/02*    (2006.01)
    (Continued)

(52) U.S. Cl.
    CPC ........... *G21C 13/10* (2013.01); *G21C 13/022* (2013.01); *G21C 13/024* (2013.01); *G21C 1/084* (2013.01); *Y02E 30/40* (2013.01)

(58) Field of Classification Search
    CPC ...... G23C 13/024; G23C 13/00; G23C 13/10; G21C 13/10; G21C 1/084; G21C 13/02;
    (Continued)

(56) References Cited

U.S. PATENT DOCUMENTS 3,459,635 A * 8/1969 Bevilacqua ............ G21C 9/012
                                                      376/282
3,865,688 A * 2/1975 Kleimola ................. G21C 9/00
                                                      376/246
(Continued)

FOREIGN PATENT DOCUMENTS

CN           102483963 A    5/2012
EP         2 955 719 A2    12/2015
(Continued)

OTHER PUBLICATIONS

General Electric Company, "The ABWR Plant General Description", Dec. 2006.*
(Continued)

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

An operating floor confinement has an operating floor, a sidewall that surrounds the operating floor, a ceiling that is provided on an upper portion of the sidewall, a reactor well, a fuel pool, a dryer and separator pit, an equipment hatch that is provided on the sidewall, an air lock that is provided on the sidewall, and an isolation valve that is provided in a penetration line. The operating floor confinement forms a pressure boundary having pressure resistance and a leakage protection function. The operating floor confinement is separated from an equipment area of the reactor building and has no blowout panel.

8 Claims, 15 Drawing Sheets

(51) Int. Cl.
*G21C 13/024* (2006.01)
*G21C 1/08* (2006.01)

(58) Field of Classification Search
CPC .... G21C 13/022; G21C 13/024; G21C 9/004; G21C 9/06
USPC .................................................. 376/283, 293
See application file for complete search history.

(56) References Cited

U.S. PATENT DOCUMENTS

| | | | | |
|---|---|---|---|---|
| 5,215,708 | A * | 6/1993 | Fennern | G21C 15/18 376/293 |
| 5,388,130 | A * | 2/1995 | Posta | G21C 1/086 376/293 |
| 2007/0092053 | A1 | 4/2007 | Sato | |
| 2012/0121056 | A1* | 5/2012 | Sato | G21C 9/004 376/280 |
| 2012/0294404 | A1* | 11/2012 | Wada | G21C 9/06 376/256 |
| 2016/0019988 | A1* | 1/2016 | Bonhomme | G21C 13/02 376/277 |

FOREIGN PATENT DOCUMENTS

| JP | 54 149570 | 10/1979 |
|---|---|---|
| JP | 63-21594 | 1/1988 |
| JP | 9-101393 | 4/1997 |
| JP | 10-142373 | 5/1998 |
| JP | 10-282284 A | 10/1998 |
| JP | 2004-333357 | 11/2004 |
| JP | 3601999 B2 | 12/2004 |
| JP | 2007-10457 | 1/2007 |
| JP | 2009-58496 | 3/2009 |
| JP | 2010-32526 A | 2/2010 |
| JP | 2014-10080 | 1/2014 |
| JP | 2014-81219 | 5/2014 |
| JP | 5642639 B2 | 12/2014 |

OTHER PUBLICATIONS

Ervin, "River Bend Station Tour Description", Nov. 2009. (Year: 2009).*
Galyean, "Assessment of ISLOCA risk: Methodology and application to a Babcock and Wilcox nuclear power plant", vol. 2, Appendices A-H, NUREG/CR-5604-vol. 2; EGG-2608-vol. 2. US Nuclear Regulatory Commission, 1992. (Year: 1992).*
Park, "Containment: More than one way to meet safety and economic goals", IAEA-TECDOC-1117, IAEA-SM-353/17 (1999) pp. 128-148. (Year: 1999).*
Combined Search and Examination Report dated Oct. 18, 2016 in United Kingdom Patent Application No. 1606736.5.
Combined Chinese Office Action and Search Report dated May 2, 2017 in Patent Application No. 201610304143.0 (with English language translation).
Kouji Andou, et al., "Conceptual Study on the Containment Design Aiming at "No Evacuation"" GENES4/ANP2003, Sep. 2003, pp. 8-12.

* cited by examiner

OPERATING FLOOR CONFINEMENT AND NUCLEAR PLANT

CROSS-REFERENCE TO RELATED APPLICATION

This application is based upon and claims the benefit of priority from Japanese Patent Application No. 2015-099952, filed on May 15, 2015; the entire content of which is incorporated herein by reference.

FIELD

Embodiments of the present invention relate to operating floor confinements and nuclear plants.

BACKGROUND

A conventional boiling water nuclear plant and its operating floor section will be outlined with reference to FIGS. 9 to 12.

FIG. 9 is an elevation view showing an example of the arrangement of a reactor building 100 of a conventional boiling water nuclear plant (corresponding to a cross sectional view of FIG. 10 taken along arrow IX-IX).

The example shown herein is based on a plant known as the ABWR. The reactor building 100 includes a base mat 101, a sidewall 102, and a ceiling 103. The mat 101 is made of reinforced concrete and several meters in thickness; the bottom surface thereof is substantially square in shape. The inside of the reactor building 100 is roughly partitioned into upper and lower sections, mainly by an operating floor 15. The upper space, including the operating floor 15, is referred to as operating floor area 104, while the lower space below the operating floor 15 is referred to as equipment area 105. In the case of the ABWR, an operating floor area sidewall 104a is provided closer to the inner side than an equipment area sidewall 105a. The equipment area sidewall 105a is not uniform in thickness; the lower portion is thick, while the upper portion is thin. Inside the equipment area 105, a containment vessel 3 is provided. The containment vessel 3 is cylindrical in shape (Refer to FIG. 12).

As shown in FIG. 9, a core 1 is housed in a reactor pressure vessel 2. The reactor pressure vessel 2 is housed in the containment vessel 3. The inside of the containment vessel 3 is divided into a dry well 4, which houses the reactor pressure vessel 2, and a wet well 5. The dry well 4 and the wet well 5 constitute parts of the containment vessel 3. Inside the wet well 5, a suppression pool 6 is formed. Above the suppression pool 6, a wet well gas phase 7 is formed. Outer walls of the dry well 4 and wet well 5 have been integrated to form a cylindrical outer-wall portion of the containment vessel 3 (Refer to FIG. 12). The ceiling portion of the dry well 4 is flat and is referred to as top slab 4a of the dry well 4.

In the top portion of the containment vessel 3, a containment vessel head 9, which is made of steel, is provided. The containment vessel head 9 is connected to the containment vessel 3 via flanges 10, which allow the containment vessel head 9 to be detached at the time of refueling. The outer periphery of the containment vessel head 9 is surrounded by a reactor well 11. The reactor well 11 is a space formed by a sidewall 12, which extends upwards from the containment vessel 3 in such a way as to surround the containment vessel head 9, and a base 13, which is connected to the lower end of the sidewall 12 and supports the sidewall 12. In the case of a reinforced concrete containment vessel (RCCV), the base 13 constitutes part of the containment vessel 3. In the case of a steel containment vessel, the base 13 constitutes part of shield concrete that surrounds the steel containment vessel. Typically, the horizontal cross section of the reactor well 11 is circular. Alternatively, the horizontal cross section of the reactor well 11 may be elliptical or polygonal. The sidewall 12 and the base 13 are robust structures made of reinforced concrete and are two meters or more in thickness. On the inner surface of the reactor well 11, steel liners (not shown) have been lined to ensure leak tightness.

As shown in FIG. 9, a hollow cylindrical pedestal 61 supports the reactor pressure vessel 2 through RPV (Reactor Pressure Vessel) skirt 62 and RPV support 63. As for the pedestal 61, there are various structures, such as those made of steel or concrete, or steel concrete composite. The inner space of the pedestal 61, or space of the dry well 4 that is below the reactor pressure vessel 2 and surrounded by the cylindrical wall of the pedestal 61, is referred to as a pedestal cavity 64. In the case of RCCV of the ABWR, as the cylindrical wall of the pedestal 61 constitutes the boundary wall between the wet well 5 and the dry well 4, this space is specifically referred to as a lower dry well 65. In the case of RCCV of the ABWR, the upper space of the dry well 4, excluding the lower dry well 65, is referred to as an upper dry well 66.

The dry well 4 and the suppression pool 6 are connected via LOCA (Loss of Coolant Accident) vent pipes 8. For example, although the number of the LOCA vent pipes 8 to be installed is 10 (Refer to FIG. 12), FIGS. 9 and 11 are cross-sectional and showing only two of them. The LOCA vent pipes 8 have horizontal vent pipes 8a that are submerged in the pool water of the suppression pool 6. The LOCA vent pipes 8 are opened in the pool water. In the case of RCCV, each LOCA vent pipe 8 has three horizontal vent pipes 8a, which are arranged in the vertical direction. In the case of RCCV, the LOCA vent pipes 8 are installed in such a way as to pass through the cylindrical wall of the pedestal 61. Accordingly, in the case of RCCV, the cylindrical wall of the pedestal 61 is also referred to as a vent wall. The vent wall is made of reinforced concrete and is about 1.7 meter in thickness; the inner and outer surfaces of the vent wall are made of steel. The LOCA vent pipe 8 and the pedestal 61 constitute part of the containment vessel 3.

As shown in FIG. 9, an openable equipment hatch 35 is provided to enable equipment to be moved in and out of the containment vessel 3. The equipment hatch 35 has the same levels of pressure resistance and leak tightness as the containment vessel 3 when the equipment hatch 35 is closed. Moreover, an air lock 36 is provided to enable operators to get in and out of the containment vessel 3. Usually the air lock 36 has two doors with an interlock, which prevents the doors from being opened simultaneously. The air lock 36 has the same levels of pressure resistance and leak tightness as the containment vessel 3. FIG. 9 only shows the equipment hatch 35 and the air lock 36 being installed in the upper dry well 66. However, the equipment hatches 35 and the air locks 36 are also provided in the wet well 5 and the lower dry well 65.

The containment vessel 3 has typical varieties according to its materials such as steel containment vessel, reinforced concrete containment vessel (RCCV), pre-stressed concrete containment vessel (PCCV), steel concrete composite (SC composite) containment vessel (SCCV), and so on. In the case of RCCV or PCCV, steel liners have been lined on the inner surface. FIGS. 9 and 11 show an example of RCCV. While FIGS. 9 and 11 are elevation views, the outer-wall portion of the RCCV is cylindrical (Refer to FIG. 12).

In the case of a boiling water reactor, the atmosphere of the containment vessel 3 is inerted with nitrogen during normal operation so that the oxygen concentration is kept low.

FIG. 10 is a plan view showing the arrangement of parts in the vicinity of the operating floor area 104 of the reactor building 100 of the conventional boiling water nuclear plant. In the operating floor area 104, the reactor well 11, a fuel pool 20, and a dryer and separator pit 30 are provided. FIG. 11 is an elevation view showing an example of the arrangement of the reactor building 100 of the conventional boiling water nuclear plant (corresponding to a cross-sectional view of FIG. 10 taken along arrow XI-XI). What is depicted in the figure is the same as in FIG. 9 but is turned 90 degrees. As shown in FIG. 11, an operating floor area sidewall 104b is on the same plane as an equipment area sidewall 105b. The reactor well 11, the fuel pool 20, and the dryer and separator pit 30 are provided in such a way as to extend downwards from the operating floor 15.

During normal operation, a shield plug (not shown) is placed above the reactor well 11. The shield plug blocks radiation, which is generated when the reactor is operating. The shield plug can be removed at the time of refueling.

As shown in FIGS. 10 and 11, the fuel pool 20 is provided in the operating floor area 104. A sidewall 21 that surrounds the fuel pool 20 is made of reinforced concrete and is about 2 meters in thickness. A floor 22 of the fuel pool 20 is also made of reinforced concrete, and is about 2.4 meters in thickness. The floor 22 is formed into a stepwise pattern, and part of the floor 22 is commonly used as the top slab 4a of the containment vessel 3. On the inner surface of the fuel pool 20, a steel liner (not shown) has been lined to ensure leak tightness. In this manner, the structure of the fuel pool 20 is robust and leak tightness is ensured. The fuel pool 20 communicates with the reactor well 11 via a fuel pool slot 23. During normal operation, the fuel pool slot 23 is closed with a leak-tight slot plug 24.

In the operating floor area 104, the dryer and separator pit 30 is provided on the opposite side of the reactor well 11 from the fuel pool 20. The dryer and separator pit 30 is a pool that is used to temporarily store a dryer and a moisture separator (not shown) after the dryer and the moisture separator are removed from inside the reactor pressure vessel 2 in refueling. The sidewall 31 surrounding the dryer and separator pit 30 is made of reinforced concrete and 2 meters or more in thickness. A floor 32 of the dryer and separator pit 30 is made of reinforced concrete and 2 meters or more in thickness; part of the floor 32 is commonly used as the top slab 4a of the containment vessel 3. On the inner surface of the dryer and separator pit 30, steel liners (not shown) have been lined to ensure leak tightness. In this manner, the structure of the dryer and separator pit 30 is robust and leak tightness is ensured. The dryer and separator pit 30 communicates with the reactor well 11 via a gate 33. During normal operation, the gate 33 is closed by a removable panel 34.

As shown in FIG. 10, on the operating floor 15, an equipment hatch 106 is provided. The equipment hatch 106 has a fall-prevention cover. When the equipment hatch 106 is opened, an opening 107 is formed in the operating floor 15 to allow equipment to be moved in or out. The opening 107 leads to a ground-level equipment access lock 109 through a shaft 108. The shaft 108 extends to each floor 110 inside the reactor building 100, as shown in FIG. 13. FIG. 13 is an elevation view showing the cross section of the reactor building 100 at the position where the equipment hatch 106 is located. The operation floor area 104 communicates with each floor 110 inside the reactor building 100 through the shaft 108. The equipment hatch 106 is not leak tight and allows air flow. Even if the equipment hatch 106 is closed, the operation floor area 104 therefore communicates with each floor 110 inside the equipment area 105 through the shaft 108.

As shown in FIG. 10, in the operating floor area 104, elevators 111 and staircases 112 are provided. The elevators 111 can go down to the lowest basement level of the reactor building 100 through elevator shafts 111a. The staircases 112 also lead to the lowest basement level of the reactor building 100. FIG. 13 is an elevation view showing the situation. The operating floor area 104 communicates with the equipment area 105 inside the reactor building 100 in multiple locations as offered by the elevator shafts 111a and the staircases 112.

As shown in FIG. 11, from the reactor pressure vessel 2, a main steam line 71 extends out of the dry well 4 and further penetrates the side wall 102 of the reactor building 100. A section of the main steam line 71 between the dry well 4 and the side wall 102 of the reactor building 100 is housed in the reactor building 100. On the main steam line 71, main steam line isolation valves 71a and 71b are provided; the main steam line isolation valve 71a is inside the dry well 4, and the main steam line isolation valve 71b outside the dry well 4. Besides the main steam line 71, on a penetration line 37 of the containment vessel 3, as a general rule containment vessel isolation valves 38a and 38b are provided inside and outside the containment vessel 3. The containment vessel isolation valves 38a and 38b may be motor-operated valves, air-operated valves, check valves, or the like, and have pressure resistance and leakage protection functions.

As shown in FIGS. 9 and 11, on the operating floor area sidewall 104a, blowout panels 113 are provided. If the main steam line 71 breaks outside of the containment vessel 3 but inside the reactor building 100, a large amount of steam is released into the reactor building 100. With the aim of discharging the steam out of the reactor building 100 in a controlled manner, the blowout panels 113 are provided on the operating floor area sidewall 104a. The steam rapidly reaches the operating floor area 104 via the shaft 108 of the equipment hatch 106, the elevator shafts 111a, and the staircases 112 (Refer to FIG. 13). The steam promptly pushes open the blowout panels 113 and blowout into the environment. The blowout panels 113 are designed to open at the set differential pressure of about 2 psid (or about 13.8 kPa). Therefore, the blowout panels 113 open by a slight rise in pressure in the operating floor area 104.

In the equipment area 105, important safety equipment is placed. Therefore, the equipment area sidewalls 105a and 105b, which are made of reinforced concrete and about 1 to 1.5 meters in thickness, are robust. The operating floor area sidewalls 104a and 104b are about 0.3 meter in thickness. The thickness of an operating floor area ceiling 104c is about 0.3 meter. The reactor building 100, including the operating floor area 104, is seismically designed to withstand a large earthquake, and robust, but pressure resistance is limited for internal pressurization over the set point of the blowout panels 113.

An example of an operation method of a conventional boiling water nuclear plant in refueling will be explained with reference to FIG. 14. For refueling, first the reactor is shut down, and the water level inside the reactor is raised to the level of the flange 2a of the reactor pressure vessel 2. From the reactor well 11, the shield plug (not shown) is removed. Furthermore, the containment vessel head 9 (Refer to FIGS. 9 and 11) is removed at the position of the flange 10. Then, the reactor pressure vessel head 2a (Refer to FIGS. 9 and 11) is removed at the position of the flange 2a. After that, the water level inside the reactor pressure vessel 2 is raised so that the reactor well 11 is filled.

The gate 33 of the dryer and separator pit 30 (Refer to FIG. 10) is opened in order to fill the dryer and separator pit 30 with water. Then, the dryer is detached and transferred to the dryer and separator pit 30. Then, the separator is removed and transferred to the dryer and separator pit 30. The slot plug 24 (Refer to FIG. 10) is removed so that the fuel pool 20 communicates with the reactor well 11. Then, the spent fuel is moved from the core 1 to the fuel pool 20, and new fuel is loaded into the core 1.

FIG. 14 shows part of a series of steps described above, or the situation where the reactor pressure vessel head 2b (Refer to FIGS. 9 and 11) has just been removed with the water level inside the reactor pressure vessel 2 at the flange 2a level.

Besides storing spent fuel that has been generated during normal operation, the fuel pool 20 also has a mission to temporarily store the core fuel when it is necessary to take out the core fuel due to repair work inside the reactor pressure vessel 2.

A conventional filtered venting system will be explained with reference to FIG. 15. A filtered venting system 50 has been adopted at nuclear plants in Europe since the accident at the Chernobyl nuclear plant. A growing number of plants in Japan have been employing the system since the accident at the Fukushima Daiichi nuclear plant.

FIG. 15 is an elevation view showing an example of how a conventional filtered venting system has been designed. The filtered venting system 50 includes: a filtered venting tank 51, which stores scrubbing water 52; an inlet pipe 53, which leads the gas inside the containment vessel 3 to the scrubbing water 52; and an exhaust pipe 54, which releases the gas in the gas phase of the filtered venting tank 51 to the environment.

The installation places of the filtered venting tank 51 and the like are not limited to the inside of the building. When the filtered venting tank 51 and the like are installed at an existing reactor, the filtered venting tank 51 and the like are placed outside of the reactor building 100 in many cases. Meanwhile, if the filtered venting tank 51 and the like are installed during construction, the filtered venting tank 51 and the like may be placed inside the reactor building 100 or the like.

There is a type in which a Venturi scrubber 55 is placed under the scrubbing water 52 and the gas is led from the inlet pipe 53 into the Venturi scrubber 55. However, the Venturi scrubber 55 is not necessarily required. There is also a type in which a metal fiber filter 56 is placed in the gas phase of the filtered venting tank 51. However, the metal fiber filter 56 is not necessarily required.

FIG. 15 shows the case where both the Venturi scrubber 55 and the metal fiber filter 56 are provided. On the inlet pipe 53, as one example, an isolation valve 57 is provided, and a rupture disk 58 is provided in parallel. Moreover, isolation valves 59a and 59b, which are normally open, are placed before and after the rupture disk 58.

Moreover, an exhaust valve 60 is placed on the exhaust pipe 54. However, the exhaust valve 60 is not necessarily required. In many cases, a rupture disk is used instead of the motor-operated valve. In the conventional filtered venting system, one end of the inlet pipe 53 is directly connected to the containment vessel 3 in order to take in the gas inside the containment vessel 3.

The conventional reactor building 100 lacks pressure resistance, and the blowout panels 113 could be mistakenly opened due to vibration resulting from earthquakes or the detonation of hydrogen. Moreover, when hydrogen is generated in the operating floor area 104 at the time of a severe accident, the hydrogen needs to be proactively released into the environment in order to prevent the detonation. The hydrogen generated at the time of a severe accident contains radioactive materials. The release of such hydrogen raises the risk of causing exposure and land contamination.

At the time of refueling, both the reactor pressure vessel head 2b and the containment vessel head 9 are removed. If an earthquake and tsunami causes a long-term station blackout (SBO) and then a meltdown, hydrogen and a large amount of radioactive materials would be directly released into the operating floor area 104. In this case, there are concerns that the hydrogen and radioactive materials could be released into the environment as the blowout panels 113 are opened. If the transfer of core fuel into the fuel pool 20 has been already completed, a failure to cool the fuel pool 20 could raise the risk of radioactive materials being released from damaged fuel into the environment via the blowout panels 113. Even if the filtered venting system 50 has been installed in the containment vessel 3, radioactive materials would be directly released into the environment from the operating floor area 104 via the blowout panels 113 at the time of refueling. Therefore, there is a possibility that the filtered venting system 50 could be bypassed and fail to function.

Accordingly, it is important to prevent the detonation of hydrogen and the release of large quantities of radioactive materials into the environment even when large amounts of hydrogen and radioactive materials are released into the operating floor area at the time of refueling. Moreover, even if a long-term station blackout is initiated at the time of refueling, it is important to safely cool both the core fuel and the spent fuel.

The object of embodiments of the present invention is therefore to prevent the leakage of radioactive materials into the environment even as the radioactive materials are released from the core fuel or the spent fuel.

DETAILED DESCRIPTION

Figure 1:
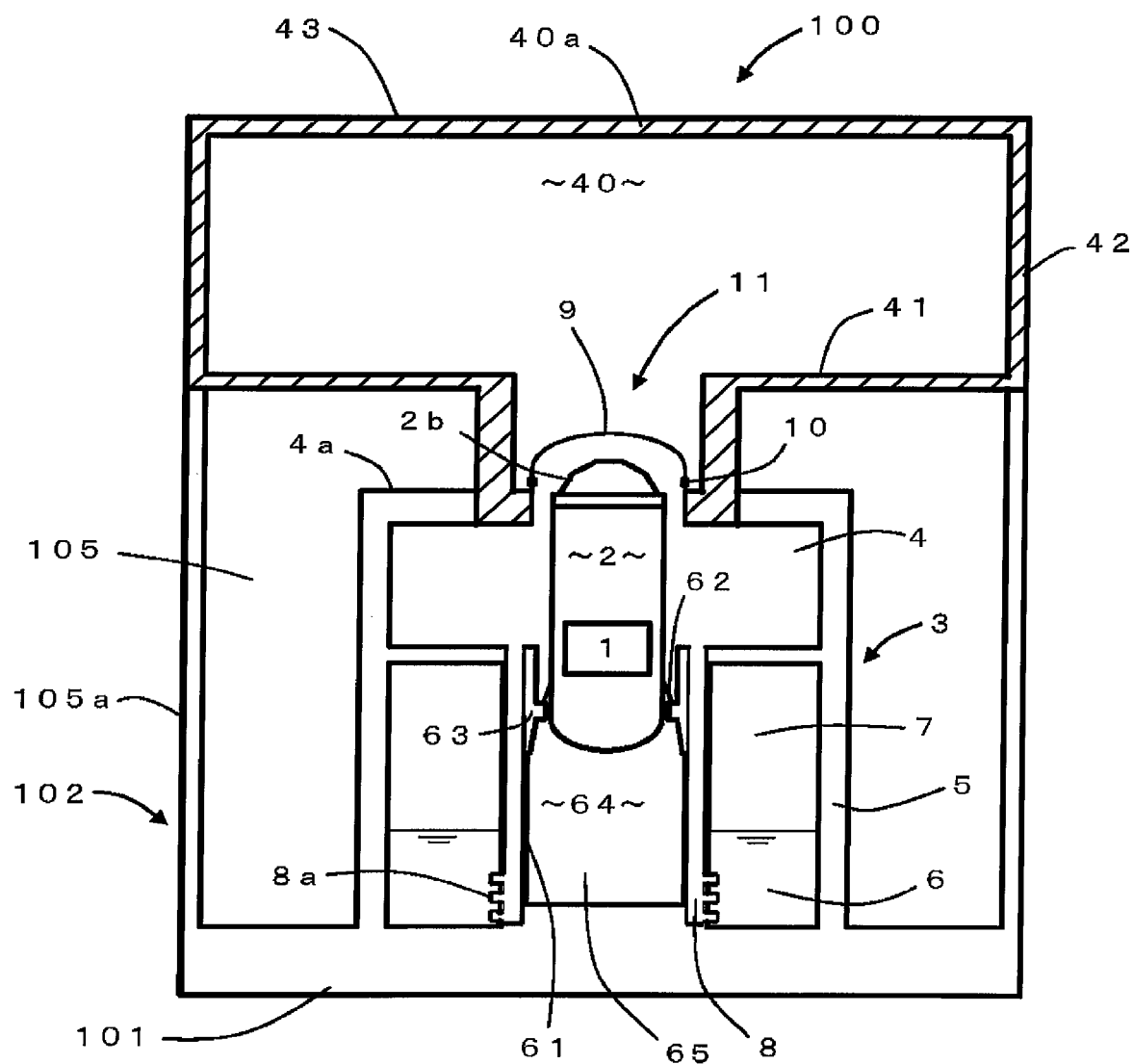
FIG. 1 is an elevation view showing the arrangement of parts in the vicinity of operating floor confinement of a nuclear plant according to a first embodiment of the present invention (corresponding to a cross-sectional view of FIG. 2 taken along arrow I-I).

According to an aspect of the present invention, there is provided an operating floor confinement that constitutes part of a nuclear plant. The nuclear plant includes: a reactor pressure vessel that houses a core; a dry well that houses the reactor pressure vessel; a wet well whose lower portion houses a suppression pool connected via a LOCA vent pipe to the dry well and whose upper portion includes a gas phase of the wet well; a containment vessel that includes at least the dry well, the LOCA vent pipe and the wet well; a containment vessel head; a reactor well that surrounds the containment vessel head; an operating floor that is provided around the reactor well; a fuel pool that is adjacent to the reactor well via a fuel pool slot; a dryer and separator pit that is adjacent to the reactor well via a gate; a main steam line; and a reactor building that houses the main steam line. The operating floor confinement comprises: the operating floor, a sidewall that surrounds the operating floor, a ceiling that is provided on an upper portion of the sidewall, the reactor well, the fuel pool, the dryer and separator pit, an equipment hatch that is provided on the sidewall, an air lock that is provided on the sidewall, and an isolation valve that is provided on a penetration line. The operating floor confinement forms a pressure boundary having pressure resistance and a leakage protection function, is in contact with the containment vessel via the containment vessel head and separated from an equipment area of the reactor building, and has no blowout panel.

According to another aspect of the present invention, there is provided a nuclear plant comprising: a core; a reactor pressure vessel that houses the core; a dry well that houses the reactor pressure vessel; a wet well whose lower portion houses a suppression pool connected via a LOCA vent pipe to the dry well and whose upper portion includes a gas phase of the wet well; a containment vessel that includes at least the dry well, the LOCA vent pipe and the wet well; a containment vessel head; a reactor well that surrounds the containment vessel head; an operating floor that is provided around the reactor well; a fuel pool that is adjacent to the reactor well via a fuel pool slot; a dryer and separator pit that is adjacent to the reactor well via a gate; a main steam line; a reactor building that houses the main steam line; and an operating floor confinement including: the operating floor, a sidewall that surrounds the operating floor, a ceiling that is provided on an upper portion of the sidewall, the reactor well, the fuel pool, the dryer and separator pit, an equipment hatch that is provided on the sidewall, an air lock that is provided on the sidewall, and an isolation valve that is provided on a penetration line, wherein the operating floor confinement forms a pressure boundary having pressure resistance and a leakage protection function, is in contact with the containment vessel via the containment vessel head and separated from an equipment area of the reactor building, and has no blowout panel.

According to another aspect of the present invention, there is provided a nuclear plant comprising: a reactor pressure vessel that houses a core; a containment vessel that has a containment vessel head at top, houses the reactor pressure vessel, and has pressure resistance; a reactor well that surrounds the containment vessel head at top of the containment vessel; an operating floor that is provided around the reactor well; a sidewall that surrounds the operating floor; and a ceiling that is provided on an upper portion of the sidewall, wherein pressure resistance of an operating floor confinement that is formed in an air-tight manner by the reactor well, the operating floor, the sidewall, and the ceiling is substantially equal to or higher than pressure resistance of the containment vessel.

Hereinafter, operating floor confinements of embodiments of the present invention, as well as nuclear plants that use the operating floor confinements, will be described with reference to FIGS. 1 to 8. The portions that are the same as, or similar to, those of the above-described conventional technique, and the same or similar portions among the embodiments described below are represented by the same reference symbols and will not be repeatedly described; only main portions will be explained.

First Embodiment

Figure 2:
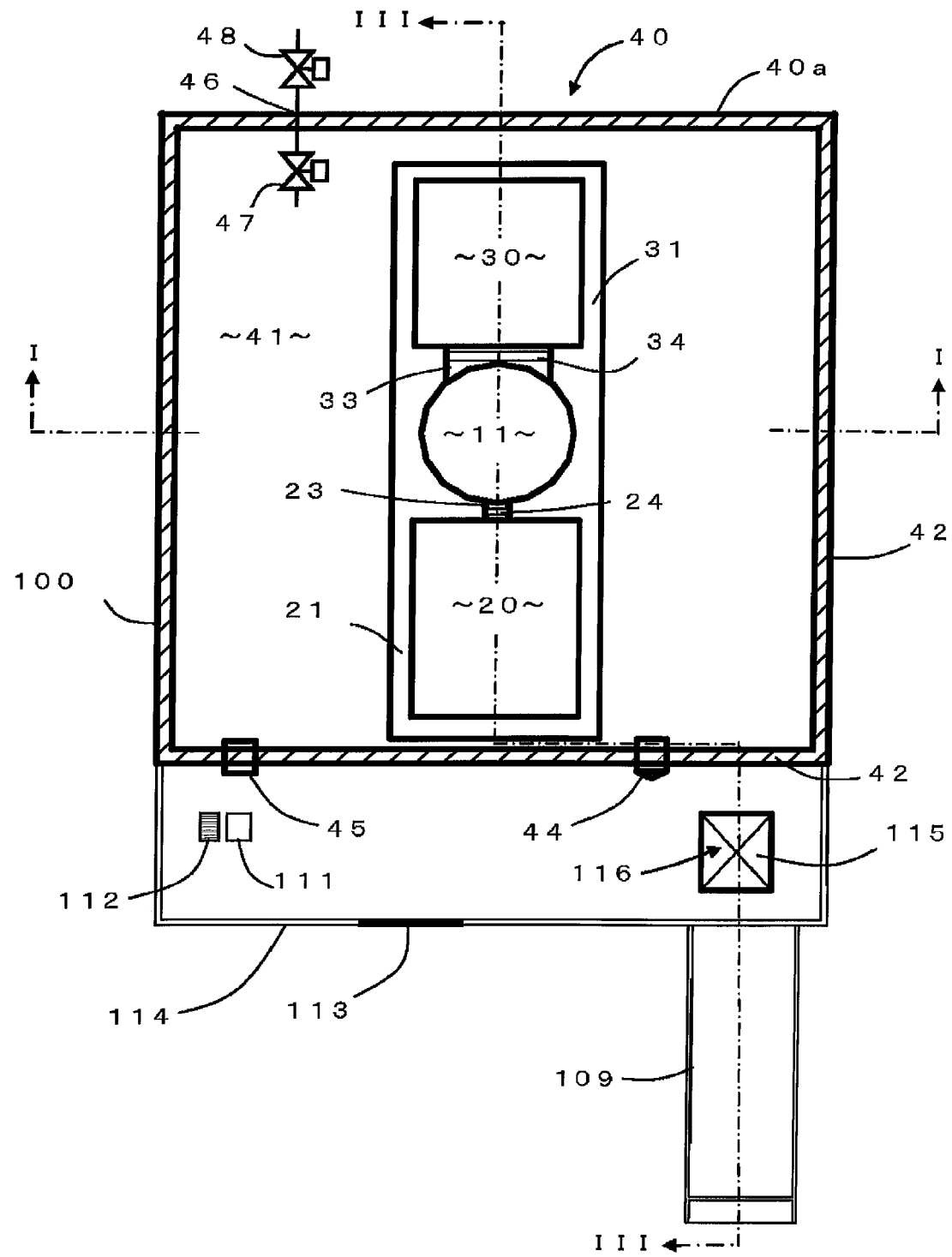
FIG. 2 is a plan view showing the arrangement of parts in the vicinity of an operating floor of the operating floor confinement of the nuclear plant according to the first embodiment of the present invention.
Figure 3:
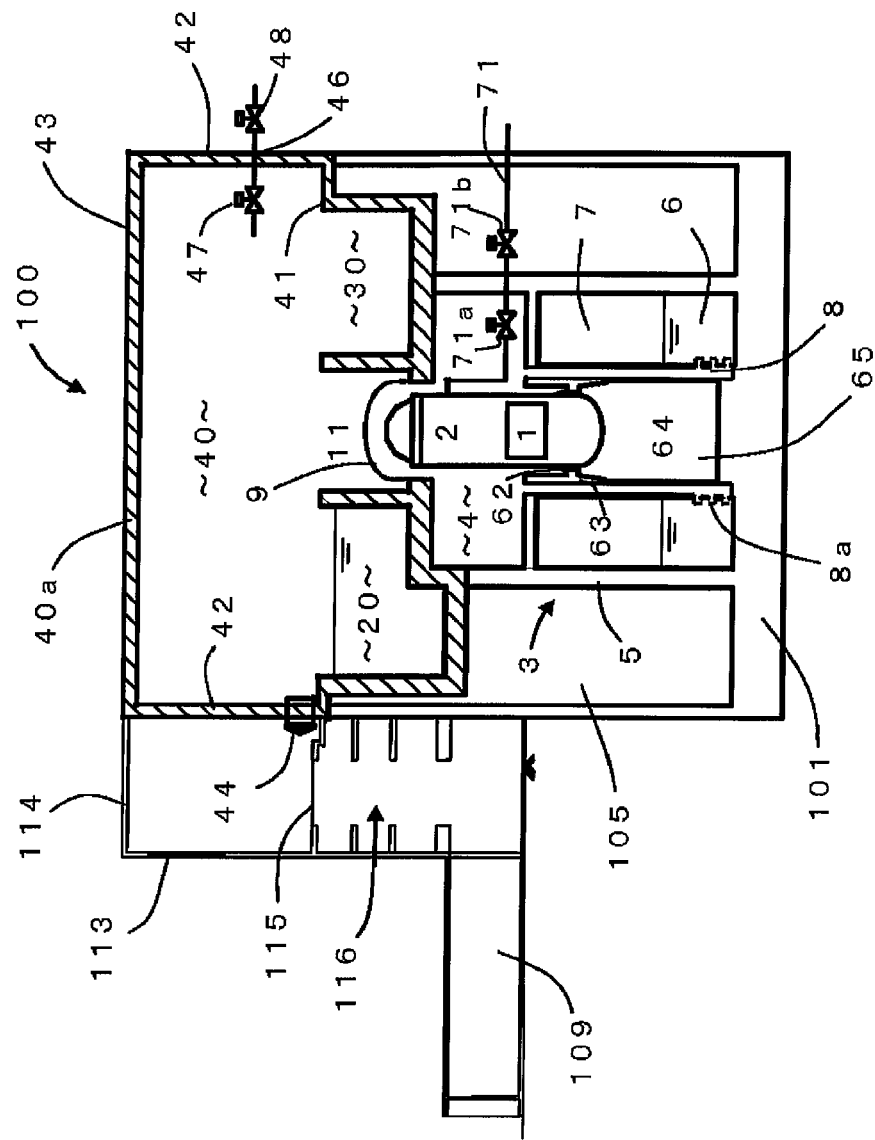
FIG. 3 is an elevation view showing the arrangement of parts in the vicinity of the operating floor confinement of the nuclear plant according to the first embodiment of the present invention (corresponding to a cross-sectional view of FIG. 2 taken along arrow III-III).

FIG. 1 is an elevation view showing the arrangement of parts in the vicinity of operating floor confinement of a nuclear plant according to a first embodiment of the present invention (or a cross-sectional view of FIG. 2 taken along arrow I-I). FIG. 2 is a plan view showing the arrangement of parts in the vicinity of an operating floor of the operating floor confinement of the nuclear plant according to the first embodiment of the present invention. FIG. 3 is an elevation view showing the arrangement of parts in the vicinity of the operating floor confinement of the nuclear plant according to the first embodiment of the present invention (or a cross-sectional view of FIG. 2 taken along arrow III-III). In the embodiment shown in FIGS. 1 and 3, a containment vessel known as RCCV is used. However, the type of the containment vessel is not limited to RCCV. The present invention can be universally applied to all pressure suppression types of containment vessels having a pressure suppression function involving a suppression pool. Moreover, as the material, SC composite, steel, and the like may also be used.

As shown in FIG. 1, the operating floor confinement 40 includes an operating floor 41, a sidewall 42, a ceiling 43, and a reactor well 11. The material of the operating floor 41, the sidewall 42, and the ceiling 43 may be the same as that of a containment vessel 3. Specifically, the parts may be made of reinforced concrete, SC composite, or steel. In the case of reinforced concrete, liners are lined as in the case of RCCV. The operating floor 41, the sidewall 42 and the ceiling 43 constitute a pressure boundary 40a, which has pressure resistance and a leakage protection function. The pressure resistance is at least at the same level as that of the containment vessel 3. The design pressure may be a gauge pressure of 310 kPa, for example. The sidewall 42 and the ceiling 43 have no blowout panels that would communicate with the environment. That is, the operating floor confinement 40 is formed to be enclosed in an airtight manner by the operating floor 41, the sidewall 42, the ceiling 43 and the reactor well 11. The parts are formed in such a way that the pressure resistance required to keep the operating floor confinement 40 air-tight is at least substantially equal to the pressure resistance of the containment vessel 3.

As shown in FIGS. 2 and 3, on the operating floor 41, a fuel pool 20 and a dryer and separator pit 30 are provided. The material of the fuel pool 20 and the dryer and separator pit 30 may be the conventional reinforced concrete or SC composite. In the case of reinforced concrete, liners are lined. The fuel pool 20 and the dryer and separator pit 30 constitute a pressure boundary 40a, which has pressure resistance and a leak control function. The pressure resistance is at least at the same level as that of the containment vessel 3. The design pressure may be a gauge pressure of 310 kPa, for example. The operating floor 41 has no staircase, elevator, elevator shaft, or equipment hatch that communicate with an equipment area 105.

Figure 9:
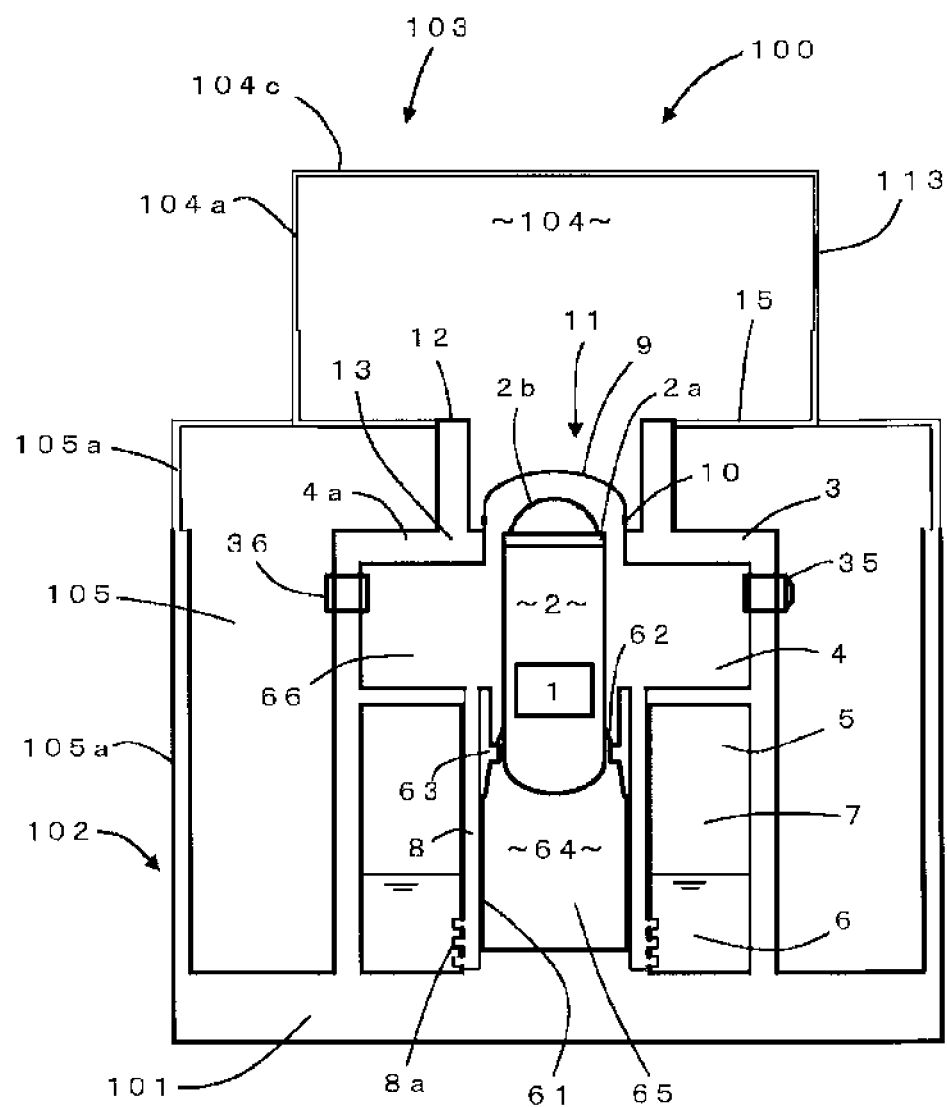
FIG. 9 is an elevation view showing an example of the arrangement of a reactor building 100 of a conventional boiling water nuclear plant (or a cross sectional view of FIG. 10 taken along arrow IX-IX).
Figure 10:
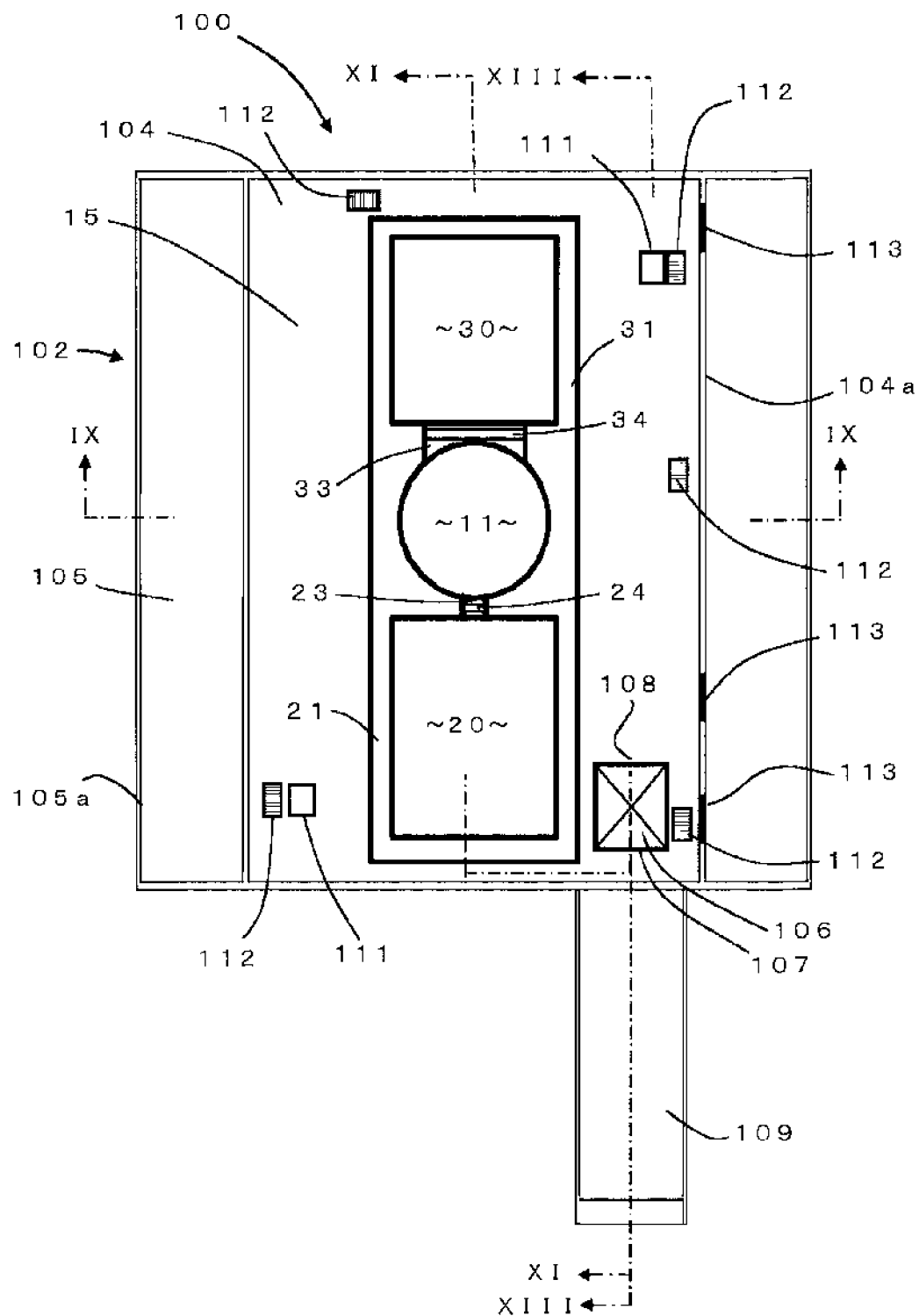
FIG. 10 is a plan view showing parts in the vicinity of the operating floor area 104 of the reactor building of the conventional boiling water nuclear plant.
Figure 11:
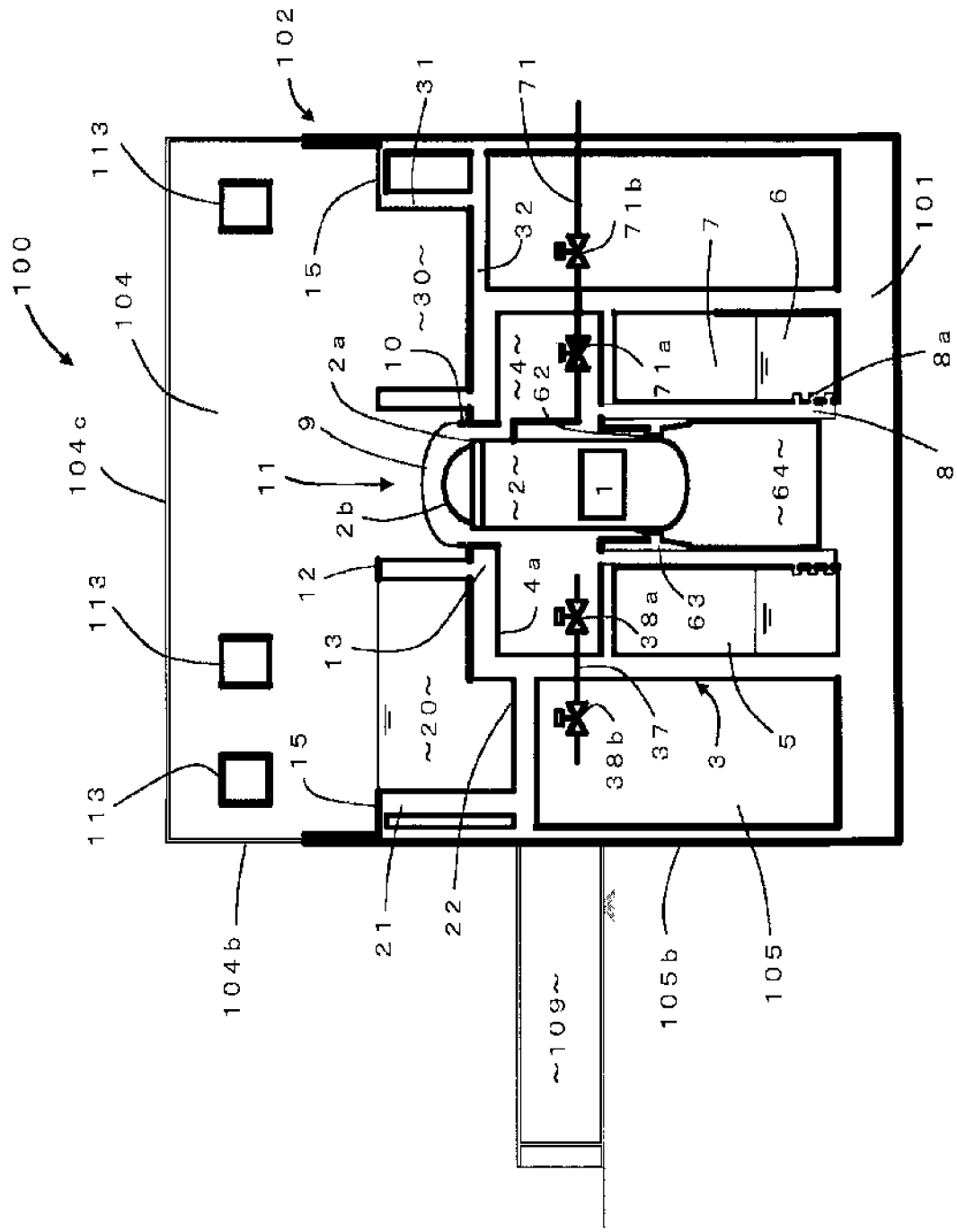
FIG. 11 is an elevation view showing an example of the arrangement of the reactor building of the conventional boiling water nuclear plant (or a cross-sectional view of FIG. 10 taken along arrow XI-XI).
Figure 12:
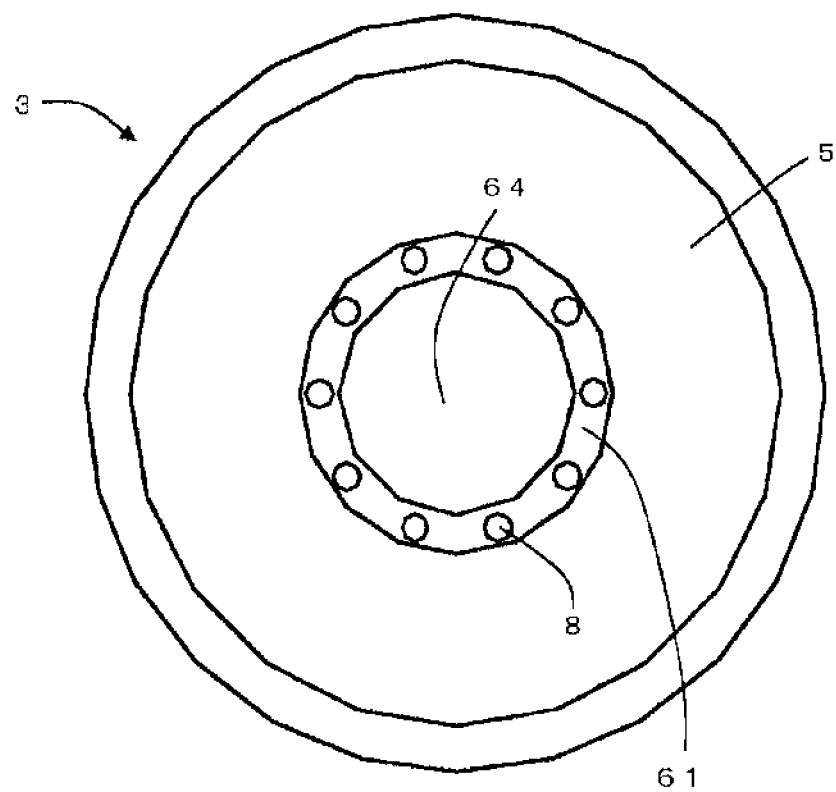
FIG. 12 is a plan view showing an example of the arrangement of the reactor building of the conventional boiling water nuclear plant.
Figure 13:
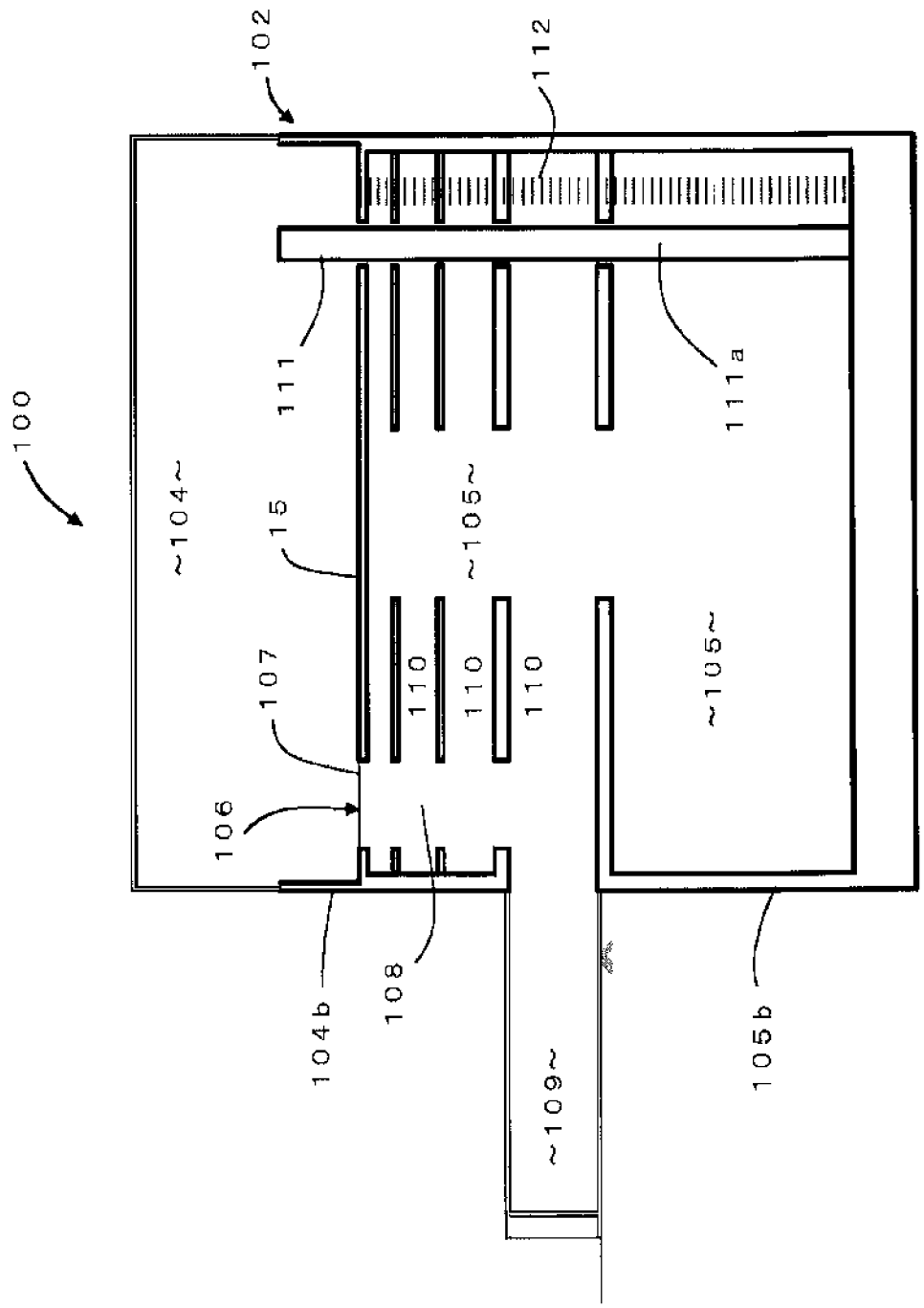
FIG. 13 is an elevation view showing a cross section of the reactor building at a position where an equipment hatch is located (or a cross-sectional view of FIG. 10 taken along arrow XIII-XIII).
Figure 14:
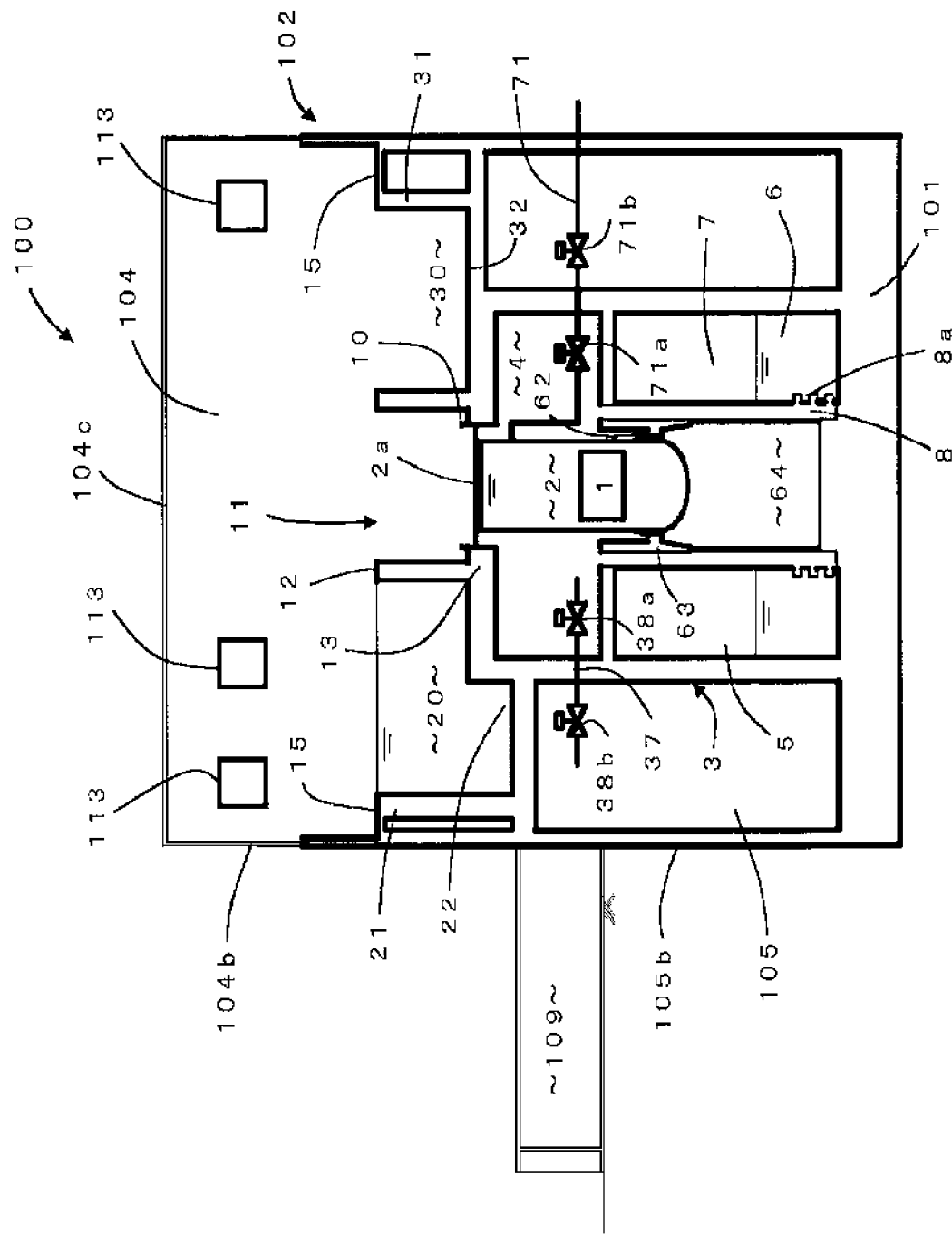
FIG. 14 is an elevation view showing an example of the arrangement of a conventional boiling water nuclear plant at the time of refueling (or a cross-sectional view of FIG. 10 taken along arrow XI-XI).
Figure 15:
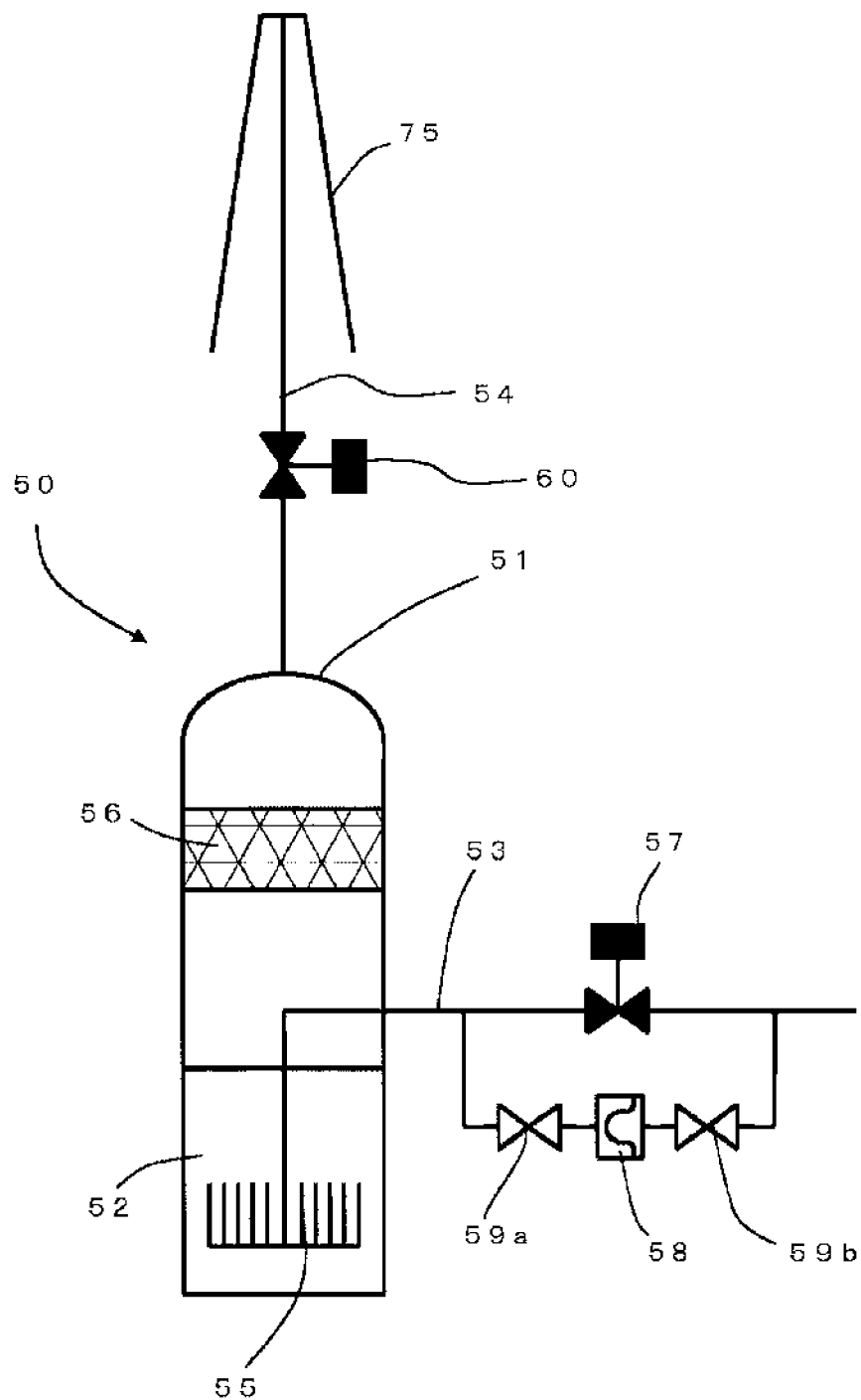
FIG. 15 is an elevation view showing a cross section of an example of a conventional filtered venting system.

As shown in FIGS. 2 and 3, an openable equipment hatch 44, which has pressure resistance and leak tightness, is provided on the sidewall 42 to allow equipment to be moved in and out of the operating floor confinement 40. For example, the equipment hatch 44 may be identical to the pressure-resistant, leak-tight equipment hatch 35 (Refer to FIG. 9), which is provided on the containment vessel 3. An openable air lock 45, which has pressure resistance and leak tightness, is provided on the sidewall 42 to enable operators to get into and out of the operating floor confinement 40. For example, the air lock 45 may be identical to the pressure-resistant, leak-tight air lock 36 (Refer to FIG. 9), which is provided on the containment vessel 3.

As shown in FIGS. 2 and 3, an auxiliary access building 114 is provided adjacent to the reactor building 100. Each floor of the auxiliary access building 114 communicates with each floor of the equipment area 105 of the reactor building 100 via openings (not shown). An elevator 111 and a staircase 112 are provided inside the auxiliary access building 114 to allow operators to go upstairs and downstairs. This gives operators access to each floor of the equipment area 105 from each floor of the auxiliary access building 114. Operators can also get into the operating floor confinement 40 via the air lock 45.

In order to enable large-size equipment to be moved in, an equipment hatch 115 and a shaft 116 are provided inside the auxiliary access building 114. An equipment access lock 109 is provided on the auxiliary access building 114. An auxiliary crane (not shown) is provided in the auxiliary access building 114 to lift large-size equipment. A blowout panel 113 is provided on the sidewall of the auxiliary access building 114.

Furthermore, a plurality of air locks may be provided on the sidewall 42. Auxiliary access buildings are provided at each location of the plurality of the air locks. In the auxiliary access buildings an elevator and a staircase are provided. This would improve the accessibility for operators.

In FIG. 3, in each of penetration lines 46 such as air conditioning ducts, isolation valves 47 and 48, which have pressure resistance and a leak control function, are provided. For example, the isolation valves 47 and 48 may be identical to the isolation valves of the containment vessel 3. The internal radiation level and temperature of the operating floor confinement 40 are measured and the isolation valves 47 and 48 perform an automatic isolation in response to signals indicating a high radiation level or a high temperature. After the isolation valves 47 and 48 are closed, the operating floor confinement 40 has pressure resistance and a leak control function, thereby confining radioactive materials.

According to the above-described arrangement of the present embodiment, the operating floor confinement 40 forms the pressure boundary 40a. Therefore, even if radioactive materials are released from the core fuel or the spent fuel, the leakage of the radioactive materials into the environment can be prevented.

Second Embodiment

Figure 4:
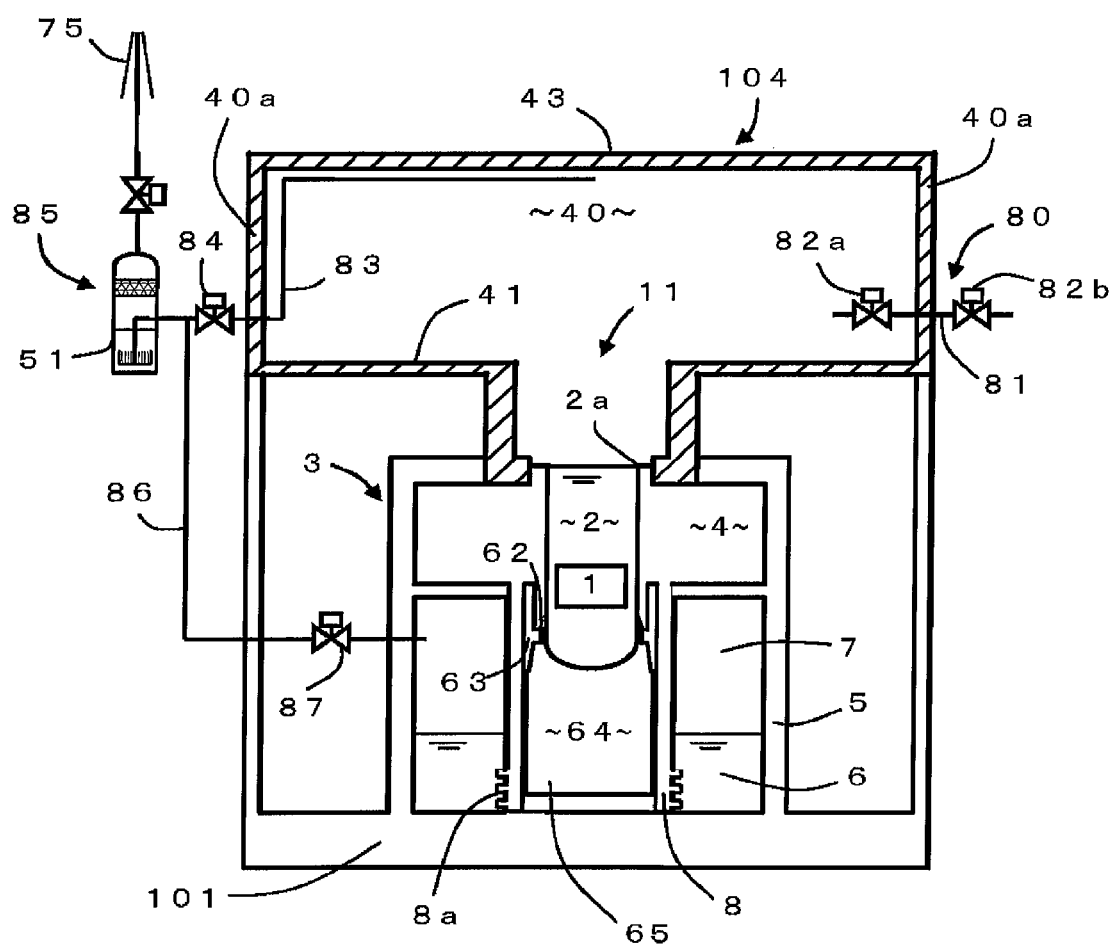
FIG. 4 is an elevation view showing the arrangement of parts in the vicinity of operating floor confinement of a nuclear plant according to a second embodiment of the present invention (corresponding to a cross-sectional view of FIG. 2 taken along arrow I-I).

FIG. 4 is an elevation view showing the arrangement of parts in the vicinity of operating floor confinement of a nuclear plant according to a second embodiment of the present invention (or a cross-sectional view of FIG. 2 taken along arrow I-I). FIG. 4 shows a situation in the midst of preparation for refueling work. That is, both a containment vessel head 9 and a reactor pressure vessel head 2b (See FIG. 1) have been removed, and the water level in the reactor is the same level as a flange 2a of the reactor pressure vessel 2.

According to the present embodiment, an external venting system 80 is provided to let the atmosphere inside the operating floor confinement 40 out. The external venting system 80 includes: a vent pipe (external vent pipe) 81, which penetrates a pressure boundary 40a of the operating floor confinement 40; and isolation valves (external vent isolation valves) 82a and 82b, which are provided on the vent pipe 81. In the illustrated example, an external tip portion of the vent pipe 81 is opened to the outside air. Alternatively, the external tip portion may be led to a stack 75. Two isolation valves 82a and 82b are provided. Alternatively, only a single valve may be provided.

According to the present embodiment, an operating floor confinement filtered venting system 85 is further provided to remove radioactive materials from the atmosphere of the operating floor confinement 40 during venting the atmosphere of the operating floor confinement 40. The operating floor confinement filtered venting system 85 includes: a filtered venting tank 51, which is provided outside the operating floor confinement 40; a pipe (filtered vent pipe) 83, which penetrates the pressure boundary 40a of the operating floor confinement 40 and is connected to the filtered venting tank 51; and an isolation valve (filtered vent isolation valve) 84, which is provided on the pipe 83.

To the filtered venting tank 51, a pipe 86 that extends from the containment vessel 3 is also connected. Therefore, the filtered venting tank 51 can process the atmosphere from the containment vessel 3 at a time when a severe accident occurs during normal operation. On the pipe 86, an isolation valve 87 is provided. After the isolation valve 87 is opened, the atmosphere inside the containment vessel 3 can be introduced via the pipe 86 into the filtered venting tank 51, where the atmosphere is processed.

The operation and effects of the present embodiment will be explained with reference to FIG. 4. As shown in FIG. 4, suppose that both the containment vessel head 9 and the reactor pressure vessel head 2b (See FIG. 1) are removed as part of preparation for refueling at the plant, and that the water level in the reactor pressure vessel 2 is at the flange 2a level of the reactor pressure vessel 2, and then a station blackout is triggered by a giant earthquake or the like. In such a case, it becomes impossible to inject water into the reactor pressure vessel 2, and the water in the reactor starts to boil due to high temperature caused by decay heat generated from the core fuel. As a result, the operating floor confinement 40 is filled with steam, and the temperature inside the operating floor confinement 40 rises.

In response to a signal indicating a high temperature of the reactor water (e.g., 100 degrees Celsius), the isolation valves 47 and 48 (See FIG. 3), such as those of air conditioning ducts, are closed, and the isolation valves 82a and 82b of the external venting system 80 are opened. The opening or closing of the valves are automatically performed in response to the signal. Alternatively, the opening or closing of the valves may be manually performed because there is enough time. The valves are driven by power from an alternate power source, which is independently provided in order to deal with severe accidents, or from an alternate nitrogen supply equipment.

As a result, a large amount of steam caused by the boiling of the reactor's water is released by the external venting system 80 into the environment. At this time, all the air, or atmosphere, of the operating floor confinement 40 is released into the environment along with the reactor's steam. As a result, after a certain period of time, all the atmosphere inside the operating floor confinement 40 is replaced with steam. If the free space volume of the operating floor confinement 40 is about 40,000 m³, it would take about six hours to replace all the atmosphere inside the operating floor confinement 40 with steam in the case of 1350 MWe ABWR. The generation of steam results in a decrease in the water level of the reactor. However, at this stage, the water level is still well above the upper end of the core 1, and the core 1 is therefore being cooled by the reactor water.

About five hours later, the water level in the reactor approaches the top end of the core 1 as the water level goes down, triggering a reactor water level "LOW-LOW" signal. In response to the reactor water level "LOW-LOW" signal, the external venting system 80 is automatically closed, while the isolation valve 84 of the operating floor confinement filtered venting system 85 is opened instead. Since there is enough time to open or close the valves, the operations may be manually carried out.

About another one hour later, or after about 12 hours have passed since the outset of the station blackout, the top end of the core 1 is exposed, causing damage to the core. After that, a large amount of hydrogen is generated due to a metal-water reaction, and radioactive materials are released from the core fuel. The hydrogen is promptly transferred to the operating floor confinement 40. At this stage, all the atmosphere of the operating floor confinement 40 is steam with no oxygen. Therefore, a detonation does not occur. The hydrogen and radioactive materials generated from the core fuel is processed by the already-opened operating floor confinement filtered venting system 85; most of the radioactive materials are removed, and only small limited fractions of the radioactive materials and hydrogen are released into the environment.

As described above, according to the present embodiment, even if a core meltdown occurs at a time when both the containment vessel head 9 and the reactor pressure vessel head 2b (Refer to FIG. 1) are removed as part of preparation for refueling work, the detonation of hydrogen and the release of radioactive materials into the environment can be prevented.

It takes more than one day after shutdown to remove the containment vessel head 9 and the reactor pressure vessel head 2b. During that period, most of radioactive noble gases decay. Therefore, even if the atmosphere of the operating floor confinement 40 is released from the operating floor confinement filtered venting system 85, this does not cause an excessive dose exposure because the amount of radioactive noble gases has been reduced. The inlet of the pipe 83 of the operating floor confinement filtered venting system 85 is arranged near the ceiling 43 of the operating floor confinement 40. This arrangement ensures that hydrogen accumulating in the upper portion of the operating floor confinement 40 is released to the outside.

After about 16 hours have passed since the onset of the station blackout, a phenomenon known as relocation occurs: the melted core fuel moves to the bottom of the reactor pressure vessel 2. The reactor water still remains in the bottom of the reactor pressure vessel 2. Therefore, the relocation of the melted core causes generation of steam as the remaining water in the reactor is rapidly heated. The steam moves to the operating floor confinement 40 and is released from the operating floor confinement filtered venting system 85. During this process, the remaining hydrogen inside the operating floor confinement 40 is all released into the environment together with the steam, and the atmosphere of the operating floor confinement 40 is completely replaced with steam. Therefore, even if the outside air, including oxygen, flows into the operating floor confinement 40 due to any reasons in the long term, this arrangement completely eliminates the possibility of the detonation of hydrogen inside the operating floor confinement 40.

In this manner, the present embodiment makes use of energy from physical phenomena in the event of a severe accident in order to eliminate the possibility of the detonation of hydrogen in the operating floor area 104, as well as the possibility of the release of an excessive amount of radioactive materials into the environment.

Third Embodiment

Figure 5:
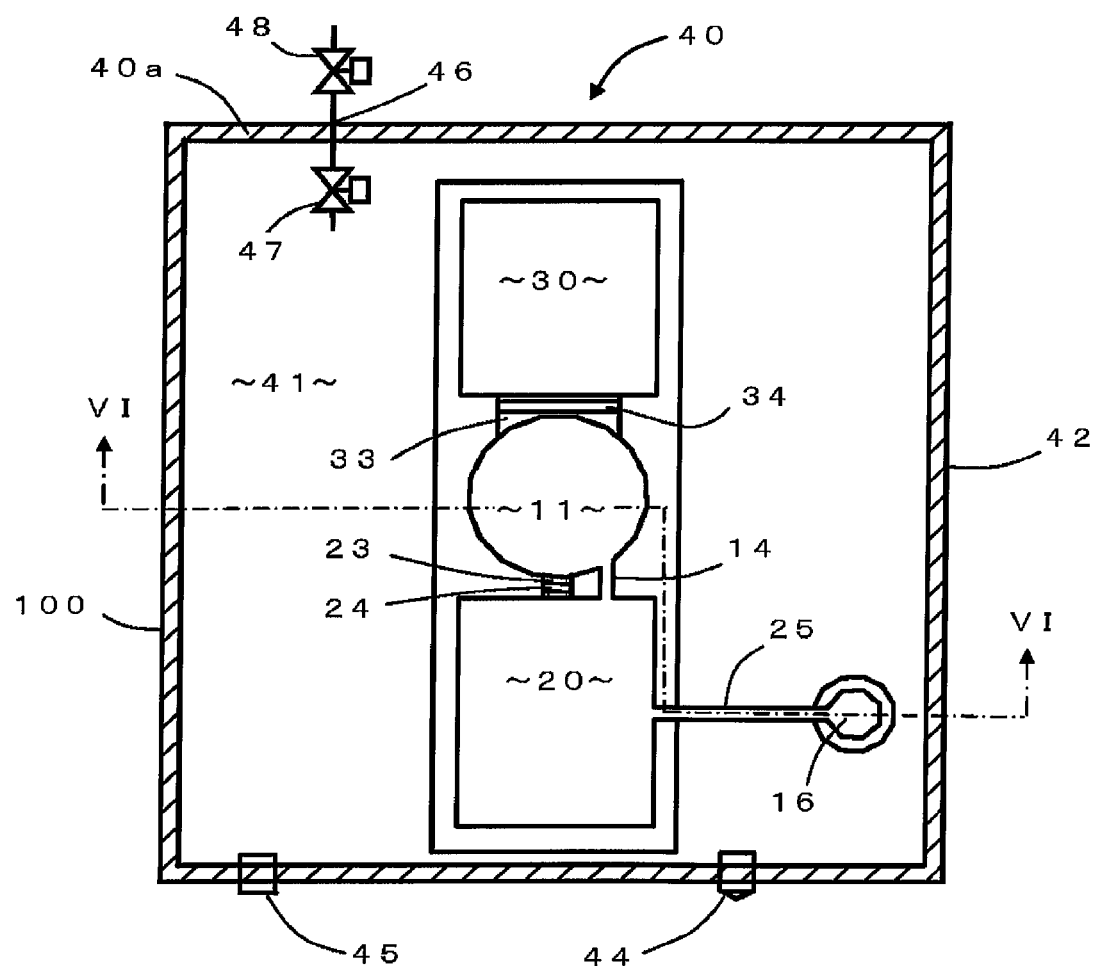
FIG. 5 is a plan view showing the arrangement of parts in the vicinity of an operating floor of operating floor confinement of a nuclear plant according to a third embodiment of the present invention.
Figure 6:
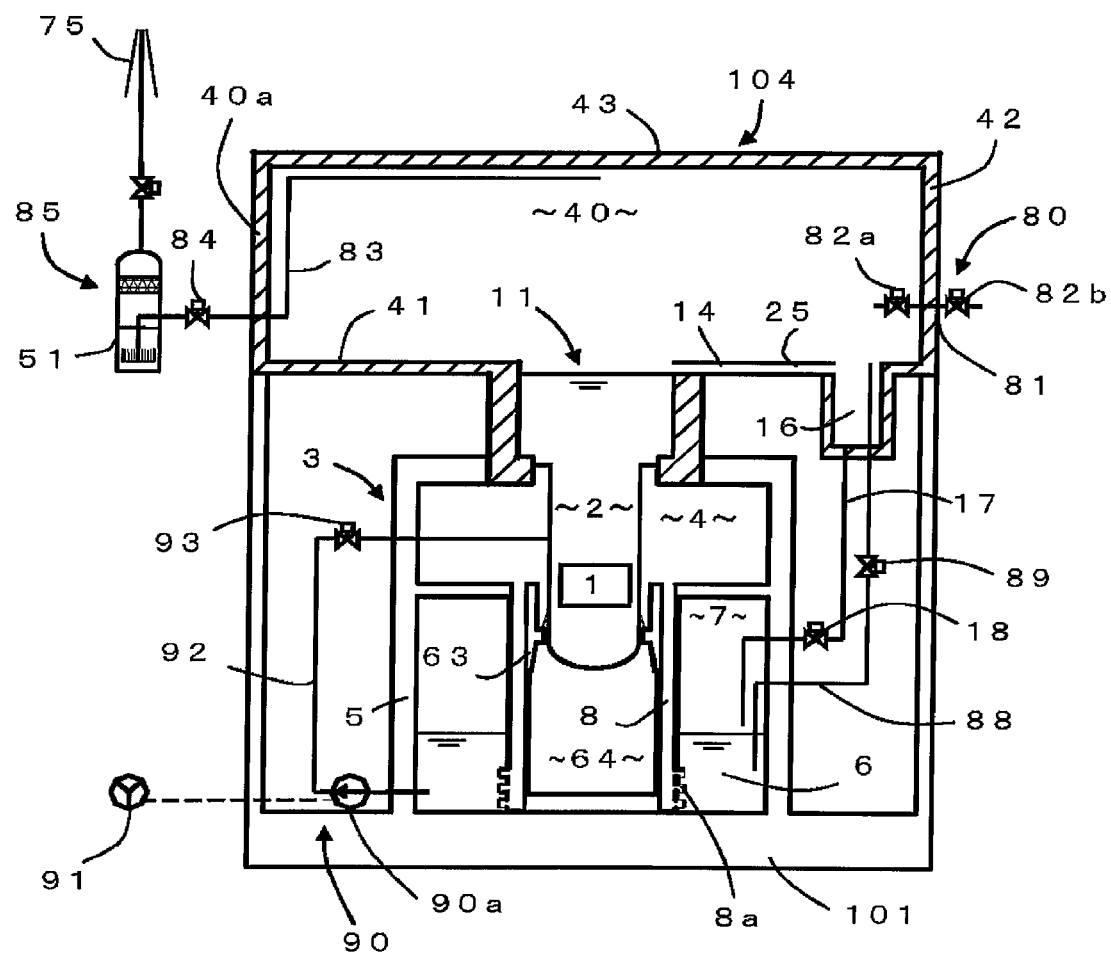
FIG. 6 is an elevation view showing the arrangement of parts in the vicinity of the operating floor confinement of the nuclear plant according to the third embodiment of the present invention (according to a cross-sectional view of FIG. 5 taken along arrow VI-VI).

FIG. 5 is a plan view showing the arrangement of parts in the vicinity of an operating floor of operating floor confinement of a nuclear plant according to a third embodiment of the present invention. FIG. 6 is an elevation view showing the arrangement of parts in the vicinity of the operating floor confinement of the nuclear plant according to the third embodiment of the present invention (or a cross-sectional view of FIG. 5 taken along arrow VI-VI). FIG. 6 shows a situation in the midst of preparation for refueling work. That is, both a containment vessel head 9 and a reactor pressure vessel head 2a (See FIG. 1) have been removed.

As shown in FIG. 5, the present embodiment includes a reactor well overflow section 14, which is arranged between the reactor well 11 and the fuel pool 20; a fuel pool overflow section 25, which is provided on the fuel pool 20; and an operating floor drain pit 16 (See FIG. 6), which is provided inside an operating floor confinement 40 in such a way as to make a dent in part of an operating floor 41.

The reactor well overflow section 14 is a drainage channel or pipe arranged near the upper end of the reactor well 11. The fuel pool overflow section 25 is a drainage channel or pipe arranged near the upper end of the fuel pool 20.

As shown in FIG. 6, the present embodiment further includes a drain pipe 17, whose one end is opened in the operating floor drain pit 16 while the other end is connected to the wet well 5; an isolation valve (drain isolation valve) 18, which is provided on the drain pipe 17; a connecting vent pipe 88, whose one end is opened to the atmosphere of the operating floor confinement 40 while the other end is connected to the containment vessel 3; and an isolation valve (connecting vent isolation valve) 89, which is provided on the connecting vent pipe 88. An opening of the connecting vent pipe 88 inside the operating floor confinement 40 is located higher than the opening of the drain pipe 17 inside the operating floor drain pit 16. Moreover, the present embodiment includes an alternate feedwater system 90, which uses the pool water of a suppression pool 6 as a water source to feed water to the reactor pressure vessel 2 in the event of a station blackout; and an alternate power source 91. The alternate feedwater system 90 includes a pipe 92 and an isolation valve 93.

The operation and effects of the present embodiment will be explained with reference to FIGS. 5 and 6. Suppose that both the containment vessel head 9 and the reactor pressure vessel head 2b are removed as part of preparation for refueling work at the plant, and that the water level in the reactor is at the flange 2a level of the reactor pressure vessel 2, and then a station blackout is triggered by a giant earthquake or the like (Refer to FIG. 4). In such a case, it becomes impossible to inject water into the reactor pressure vessel 2, and the water in the reactor starts to boil due to high temperatures caused by decay heat generating from the core fuel.

As a result, the operating floor confinement 40 is filled with steam, and the temperature inside the operating floor confinement 40 rises. In response to a signal indicating a high temperature of the reactor water (e.g., 100 degrees Celsius), the isolation valves 47 and 48 (See FIG. 3), such as those of air conditioning ducts, are closed, while the isolation valves 82a and 82b of the external venting system 80 are opened. The opening or closing of the valves are automatically performed in response to the signal. Alternatively, the opening or closing of the valves may be manually performed because there is enough time. The valves are driven by power from an alternate power source, which is independently provided in order to deal with severe accidents, or from an alternate nitrogen supply facility.

As a result, a large amount of steam caused by the boiling of the reactor water is released by the external venting system 80 into the environment. At this time, all the air, or atmosphere, of the operating floor confinement 40 is released into the environment along with the reactor steam. As a result, after a certain period of time, all the atmosphere inside the operating floor confinement 40 is replaced with steam. If the free space volume of the operating floor confinement 40 is about 40,000 m³, it would take about seven hours to replace all the atmosphere inside the operating floor confinement 40 with steam in the case of 1350 MWe ABWR.

Then, in response to the signal indicating the high temperature of the reactor's water, the alternate feedwater system 90 is activated by the alternate power source 91. The alternate feedwater system 90 injects the pool water of the suppression pool 6 into the reactor pressure vessel 2 via the pipe 92 and the isolation valve 93 by a pump 90a, thereby increasing the water level in the reactor. If the water is supplied by the alternate feedwater system 90 at a rate of about 100 m³/h, it takes about 12 hours for the water level to reach the upper end of the reactor well 11. FIG. 6 shows the water level in the reactor well 11 in that situation. The amount of steam to be generated would slightly decrease as the water is supplied from the alternate feedwater system 90. Accordingly, it requires slightly more time to completely replace the atmosphere of the operating floor confinement 40 with steam.

After the atmosphere of the operating floor confinement 40 is completely replaced with steam (about 7 hours later), the external venting system 80 is isolated, while the isolation valve 18 and the isolation valve 89 are opened instead. The full replacement of the atmosphere of the operating floor confinement 40 with steam is determined based on whether or not the pressure has reached a saturated steam pressure. The temperature and the pressure in the atmosphere of the operating floor confinement 40 are measured, and the saturated pressure is obtained based on the measured temperature.

The water level in the reactor well 11 approaches the upper end about 12 hours later. Then, the reactor's water starts to flow into the fuel pool 20 via the reactor well overflow section 14. As the water level in the fuel pool 20 approaches the upper end, the pool water inside the fuel pool 20 starts to flow into the operating floor drain pit 16 via the fuel pool overflow section 25. The water in the operating floor drain pit 16 is drained into the wet well 5 via the drain pipe 17 and goes back to the suppression pool 6.

In this manner, even as the alternate feedwater system 90 keeps supplying the pool water of the suppression pool 6 into the reactor pressure vessel 2, the suppression pool 6 is not depleted, allowing the alternate feedwater system 90 to continue operation. The pool water of the suppression pool 6 can be used as a water source because the pool water is circulated. Therefore, there is no need to bring in and secure large amounts of water from outside the plant in order to cool the reactor and the fuel pool in the event of a station blackout.

The steam inside the operating floor confinement 40 is released into the containment vessel 3 through the connecting vent pipe 88.

If the tip of the connecting vent pipe 88 is submerged in the pool water of the suppression pool 6 as shown in FIG. 6, the steam inside the operating floor confinement 40 is cooled and condensed after being transferred to the suppression pool 6.

Figure 7:
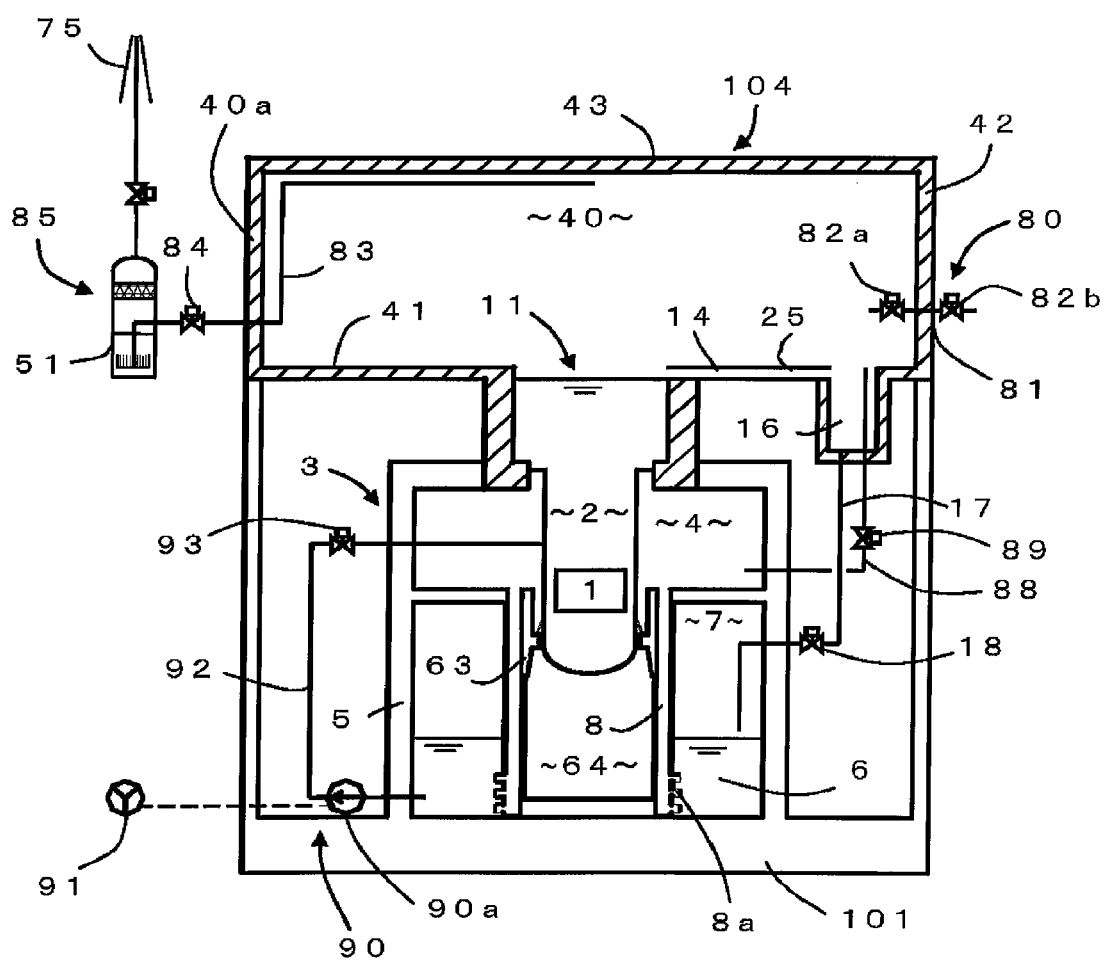
FIG. 7 is an elevation view showing the arrangement of parts in the vicinity of operating floor confinement of a nuclear plant according to a first modified example of the third embodiment of the present invention (or a cross-sectional view of FIG. 5 taken along arrow VI-VI).

FIG. 7 is an elevation view showing the arrangement of parts in the vicinity of operating floor confinement of a nuclear plant according to a first modified example of the third embodiment of the present invention (or a cross-sectional view of FIG. 5 taken along arrow VI-VI).

In the first modified example, the tip of the connecting vent pipe 88 is directed in the dry well 4. In this case, the vented steam inside the operating floor confinement 40 is transferred into the dry well 4, and is then vented via the LOCA vent pipe 8 to the suppression pool 6, where the steam is cooled and condensed.

Figure 8:
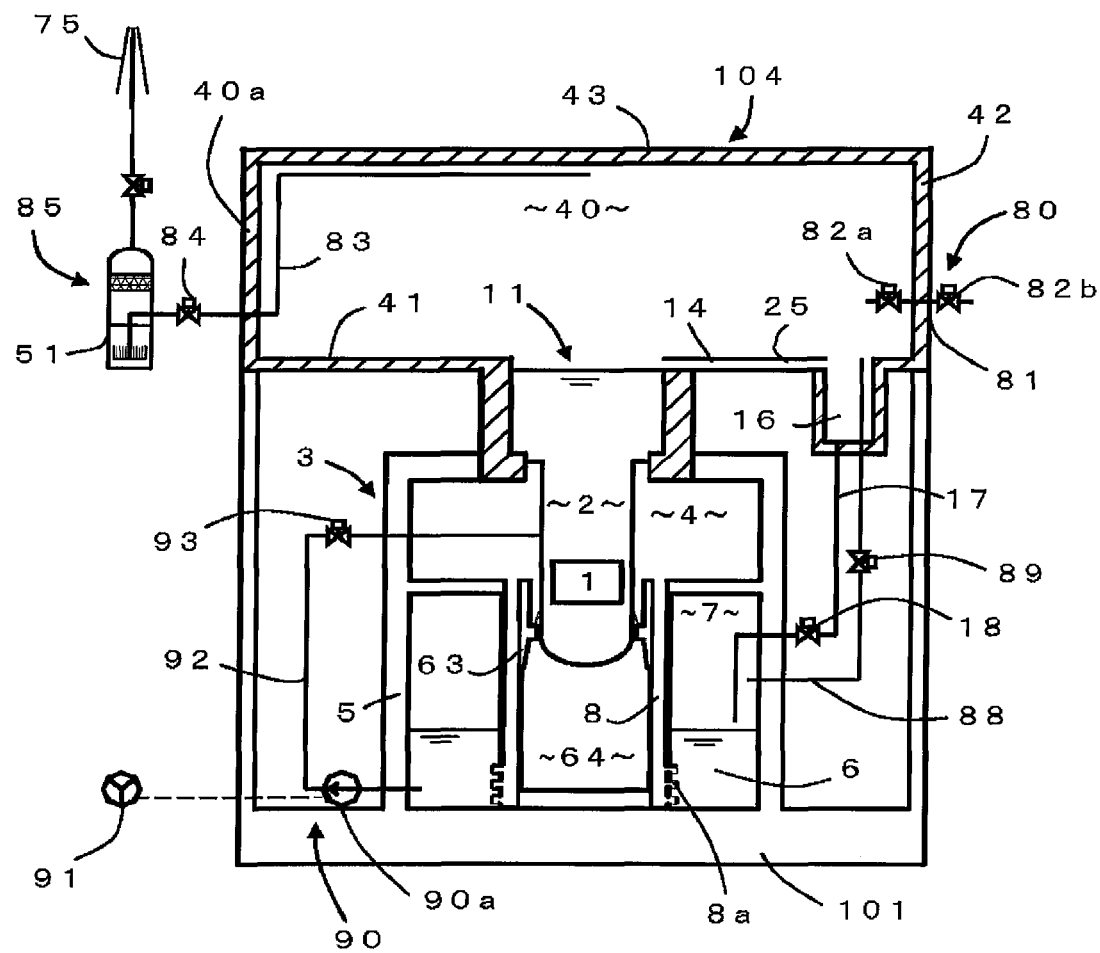
FIG. 8 is an elevation view showing the arrangement of parts in the vicinity of operating floor confinement of a nuclear plant according to a second modified example of the third embodiment of the present invention (or a cross-sectional view of FIG. 5 taken along arrow VI-VI).

FIG. 8 is an elevation view showing the arrangement of parts in the vicinity of operating floor confinement of a nuclear plant according to a second modified example of the third embodiment of the present invention (or a cross-sectional view of FIG. 5 taken along arrow VI-VI).

In the second modified example, the tip of the connecting vent pipe 88 is inserted into the wet well gas phase 7. In this case, the steam inside the operating floor confinement 40 is transferred into the wet well gas phase 7. In this case, the steam inside the operating floor confinement 40 is not directly cooled by the pool water of the suppression pool 6. However, if a passive containment vessel cooling system (not shown) is additionally provided in order to directly take in and cool the steam of the wet well gas phase 7, it is possible to cool the containment vessel 3 in an efficient manner by directing the tip of the connecting vent pipe 88 in the wet well gas phase 7.

According to the third embodiment with the above-described arrangement, even if a station blackout is triggered by a giant earthquake in a dangerous situation where both the containment vessel head 9 and the reactor pressure vessel head 2b have been removed as part of preparation for refueling work, the cooling of the core fuel can be maintained by injecting water into the reactor pressure vessel 2. Moreover, by sending the overflowing water of the reactor well 11 into the fuel pool 20, it is possible to simultaneously cool the core fuel and the spent fuel inside the fuel pool 20 without relying on an external water source. If the system is used in combination with the passive containment vessel cooling system (not shown) that directly takes in and cools the steam of the wet well gas phase 7, it is possible to cool the containment vessel 3 at the same time.

Other Embodiments

Several embodiments of the present invention have been explained. According to the embodiments, even if radioactive materials are released from the core fuel or the spent fuel at the nuclear plant, the leakage of the radioactive materials into the environment can be prevented. Moreover, since there are no blowout panels in the operating floor confinement, it is possible to prevent the blowout panels from accidentally opening even when vibration occurs from earthquakes or detonations of hydrogen. Moreover, even if hydrogen is generated in the operating floor area in the event of a severe accident, it is possible to make the operating floor confinement free of oxygen by venting the atmosphere of the operating floor confinement to the outside in advance. Therefore, it is possible to prevent the detonation of hydrogen. At the time of a severe accident, the hydrogen may contain radioactive materials. However, the filtered venting system of the operating floor confinement can remove the radioactive materials. Therefore, it is possible to prevent exposure and land contamination. Moreover, even if a long-term station blackout is initiated during refueling or other work, it is possible to safely cool both the core fuel and the spent fuel and prevent damage to the fuel.

The features of the embodiments described above may be combined in various ways.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An operating floor confinement that constitutes part of a nuclear plant, the nuclear plant including:
   a reactor pressure vessel that houses a core;
   a dry well housing the reactor pressure vessel and having a top slab;
   a wet well housing a suppression pool in its lower portion and a gas phase in its upper portion;
   a LOCA vent pipe connecting the dry well and the suppression pool;
   a containment vessel that includes at least the dry well, the LOCA vent pipe and the wet well;
   a containment vessel head;
   a main steam line; and
   a reactor building including an equipment area that houses a section of the main steam line, wherein
   the operating floor confinement is fluidically isolated from the equipment area of the reactor building and forms a pressure boundary that has pressure resistance that is at least the same level as that of the containment vessel and a leakage protection function, wherein the operating floor confinement comprises:
   a reactor well that surrounds the containment vessel head and is in contact with the containment vessel via the containment vessel head,
   an operating floor that is provided around the reactor well, the operating floor having a larger area than a cross-sectional area of the dry well, wherein the operating floor constitutes a part of the pressure boundary and has no staircase, elevator, elevator shaft, or equipment hatch that communicates with the equipment area of the reactor building,
   a sidewall that surrounds the operating floor, the sidewall being arranged wider than the cross-sectional area of the dry well, wherein the sidewall constitutes a part of the pressure boundary and has no blowout panel,
   a ceiling that is provided on an upper portion of the sidewall, constitutes a part of the pressure boundary and has no blowout panel,
   a fuel pool extending horizontally beyond the top slab of the dry well and constituting a part of the pressure boundary,
   a dryer and separator pit extending horizontally beyond the top slab of the dry well and constituting a part of the pressure boundary,
   an equipment hatch that is provided on the sidewall,
   an air lock that is provided on the sidewall,
   a penetration line that passes through the sidewall, and
   an isolation valve that is provided on the penetration line.

2. The operating floor confinement according to claim 1, further comprising
   an external venting system that includes an external vent pipe, which penetrates the pressure boundary of the operating floor confinement and communicates with outside, and an external vent isolation valve, which is provided on the external vent pipe in order to vent, to the outside, atmosphere of the operating floor confinement.

3. The operating floor confinement according to claim 1, further comprising:
a reactor well overflow section that is provided between the reactor well and the fuel pool;
a fuel pool overflow section that is provided on the fuel pool; and
an operating floor drain pit that is provided inside the operating floor confinement in such a way as to make a dent in part of the operating floor.

4. The operating floor confinement according to claim 3, further comprising:
a drain pipe having one end opened inside the operating floor drain pit while another end is connected to the wet well; and
a drain isolation valve that is provided on the drain pipe.

5. The operating floor confinement according to claim 4, further comprising:
a connecting vent pipe having one end opened in the atmosphere of the operating floor confinement while another end is connected to the containment vessel; and
a connecting vent isolation valve that is provided on the connecting vent pipe, wherein
an opening of the connecting vent pipe inside the operating floor confinement is located higher than an opening of the drain pipe inside the operating floor drain pit.

6. The operating floor confinement according to claim 1, wherein a portion of the sidewall includes the airlock and the equipment hatch, wherein
the portion of the sidewall is shared with an auxiliary access building that is built adjacent to the reactor building, wherein
each floor of the auxiliary access building communicates with each floor of the equipment area of the reactor building,
an elevator is provided in the auxiliary access building to allow operators to go upstairs and downstairs,
a staircase is provided in the auxiliary access building to allow operators to go upstairs and downstairs,
an equipment access lock is provided on a wall of the auxiliary access building,
a shaft is provided in the auxiliary access building adjacent to the equipment access lock and through each floor of the auxiliary access building,
an equipment hatch is provided on a top floor of the auxiliary access building, wherein
equipment, as well as workers, can be moved in and out to the operating floor confinement via the auxiliary access building.

7. The operating floor confinement according to claim 6, wherein
the auxiliary access building further includes a blowout panel on a sidewall of the auxiliary access building.

8. A nuclear plant comprising:
a core;
a reactor pressure vessel that houses the core;
a dry well housing the reactor pressure vessel and having a top slab;
a wet well housing a suppression pool in its lower portion and a gas phase in its upper portion;
a LOCA vent pipe connecting the dry well and the suppression pool;
a containment vessel that includes at least the dry well, the LOCA vent pipe and the wet well;
a containment vessel head;
a main steam line;
a reactor building including an equipment area that houses a section of the main steam line; and
an operating floor confinement that is fluidically isolated from the equipment area of the reactor building and forms a pressure boundary that has pressure resistance that is at least the same level as that of the containment vessel and a leakage protection function, wherein the operating floor confinement includes:
a reactor well that surrounds the containment vessel head, constitutes the pressure boundary and is in contact with the containment vessel via the containment vessel head,
an operating floor that is provided around the reactor well, the operating floor having a larger area than a cross-sectional area of the dry well, wherein the operating floor constitutes a part of the pressure boundary and has no staircase, elevator, elevator shaft, or equipment hatch that communicate with the equipment area of the reactor building,
a sidewall that surrounds the operating floor, the sidewall being arranged wider than the cross-sectional area of the dry well, wherein the sidewall constitutes a part of the pressure boundary and has no blowout panel,
a ceiling that is provided on an upper portion of the sidewall, constitutes a part of the pressure boundary and has no blowout panel,
a fuel pool extending horizontally beyond the top slab of the dry well and constituting a part of the pressure boundary,
a dryer and separator pit extending horizontally beyond the top slab of the dry well and constituting a part of the pressure boundary,
an equipment hatch that is provided on the sidewall,
an air lock that is provided on the sidewall,
a penetration line that passes through the sidewall, and
an isolation valve that is provided on the penetration line.

* * * * *